Figure 3:
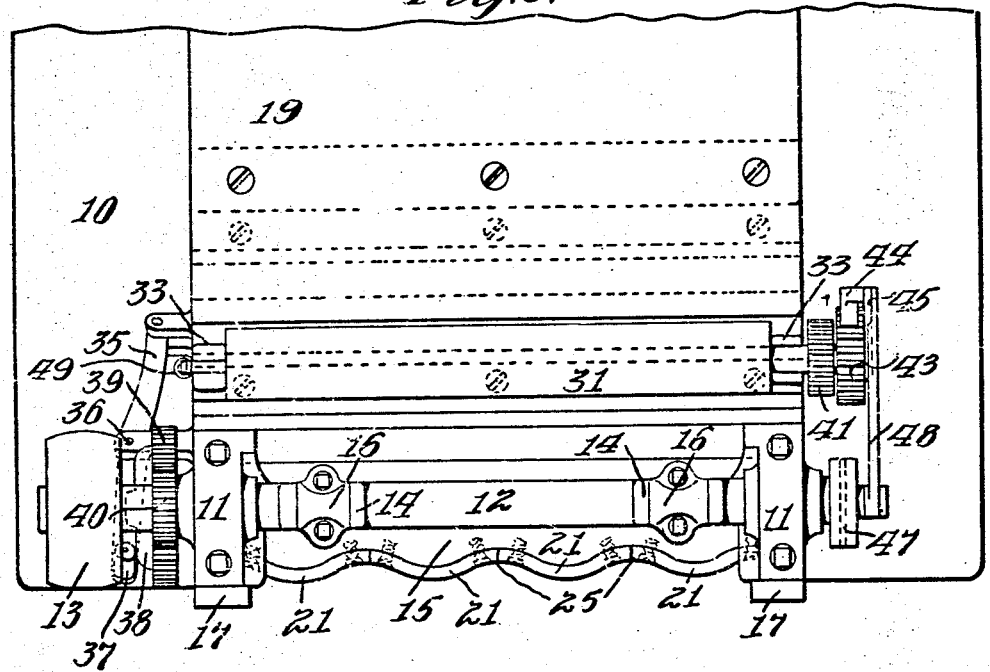

No. 875,067.  
PATENTED DEC. 31, 1907.
W. R. GREEN.  
MACHINE FOR MAKING FIBER STRANDS.  
APPLICATION FILED JAN. 13, 1906.
2 SHEETS—SHEET 1.
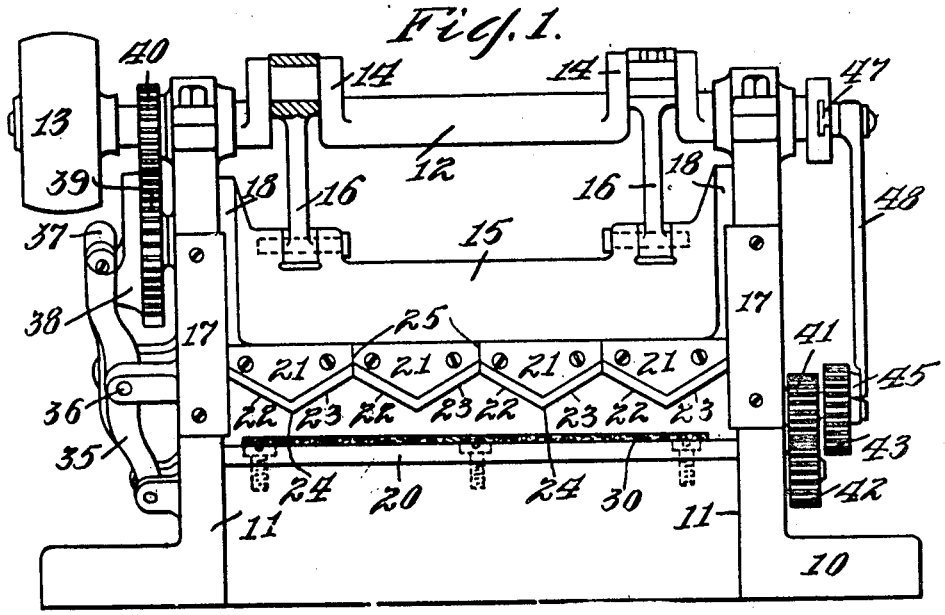
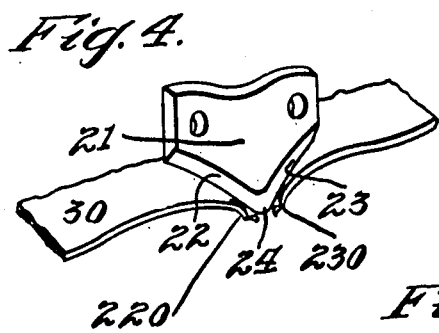
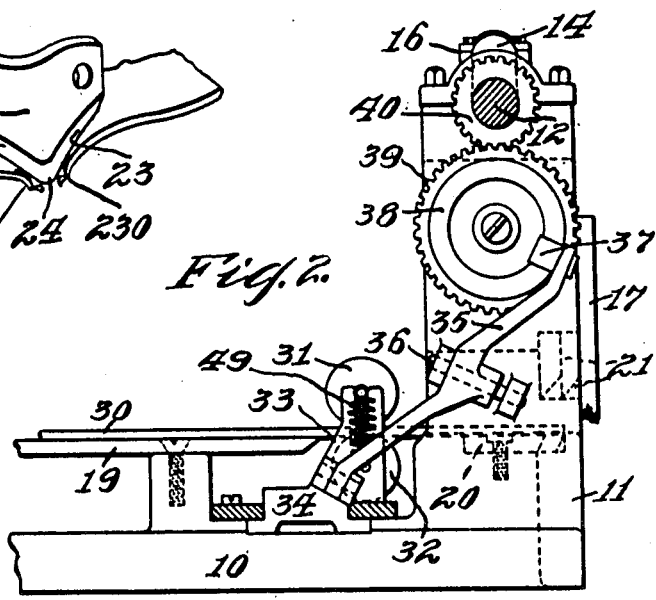
Witnesses:  
H. Fleischer  
C. G. Fuss
Inventor:  
Willard R. Green,  
By his attorney,  
F. H. Richards.

No. 875,067. PATENTED DEC. 31, 1907.
W. R. GREEN.
MACHINE FOR MAKING FIBER STRANDS.
APPLICATION FILED JAN. 13, 1906.

2 SHEETS—SHEET 2.

Witnesses
H. Fleischer,
C. C. Fuss.

Inventor:
Willard R. Green,
By his attorney;
F. A. Richards.

UNITED STATES PATENT OFFICE.

WILLARD R. GREEN, OF MUSCATINE, IOWA.

MACHINE FOR MAKING FIBER STRANDS.

No. 875,067.  Specification of Letters Patent.  Patented Dec. 31, 1907.

Application filed January 13, 1906. Serial No. 295,907.

*To all whom it may concern:*

Be it known that I, WILLARD R. GREEN, a citizen of the United States, residing in Muscatine, in the county of Muscatine and State of Iowa, have invented certain new and useful Improvements in Machines for Making Paper-Fiber Strands, of which the following is a specification.

This invention relates to a machine for making paper fiber - strands especially adapted to use in making absorbents of that class in which the mass of fiber composing the same is so constituted and organized as to provide active absorptive qualities combined with efficient distributive qualities, and particularly such as are described in my co-pending application, filed January 13th, 1906, Serial No. 295,908.

It will be remembered that in using some kinds of absorptive materials, such for instance, as fine vegetable fibers massed together, such as cotton or linen fiber, for instance, there is a marked tendency in many cases, especially where the fluids to be absorbed are of a slightly pasty or albuminous character or of a coagulative nature for the thicker components of the fluid to form a coating over the exterior mass of the fiber and so prevent the efficient operation of the fiber as an absorbent for the more fluid portions of the substances to be absorbed.

One of the objects of my present improvement is to provide a device for commercially manufacturing material to minimize these objections. Relatively fine fibers such as wood fibers so called will be formed together in some suitable manner into a sheet, and this by my improved device will be converted into relatively large fiber like bodies or fiber-strands, and by mingling these together either by themselves or mixed with another and preferably finer fiber component, thereby obtaining a highly active absorbent quality, while maintaining the mass of the whole sufficiently open in its texture and composition to provide for the necessary free distribution between such larger strands of which the same is composed.

Reference is made to my copending application, Serial No. 217,972, filed July 25, 1904, which matured into United States Letters Patent No. 810,139, dated January 16th, 1906, for absorbent material and fiber stock therefor wherein properly prepared fiber stock is incorporated into absorbent material. Reference may also be made to my copending application, Serial No. 295,909, filed January 13th, 1906, wherein one feature of the improvement relates to the reinforcement of the fiber-strands in such a manner that each will be self sustaining and resist compression and matting when the mass is subjected to pressure and to the action of fluid. And this device is peculiarly adapted for producing, from sheets made of some fibrous absorptive which have been treated upon one side with some adhesive substance in the nature of a glue or cement-like material non-soluble in water, elongated curved bodies, which from the fact that they are made from fibers, and from the fact that they somewhat resemble strands, will in the present description be referred to as fiber-strands, although viewed from certain aspects they might not really be designated as strands; but for the purpose of the present description it appears that such use is sufficiently accurate. Not only does the device shear the prepared stock into bodies of curved formation; but adds to these a curly or spiral formation.

Figure 5:
Figure 6:
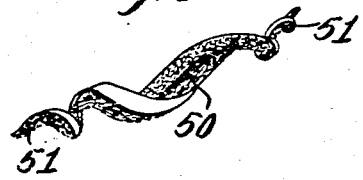

Drawings illustrating my present improvement accompany this specification, and wherein Figure 1 illustrates a front view of a form of mechanism which embodies my present improvements. Fig. 2 is an end view thereof. Fig. 3 is a plan view. Fig. 4 is a perspective detail of one of the cutters detached, showing it in the act of severing two strips from a sheet of stock. Fig. 5 is a diagram of a strip of the stock as it is cut by the zigzag feed; and Fig. 6 is a detail of one of the shavings from the strip which are herein referred to as fiber-strands.

In the mechanism herein illustrated there is shown a bed 10 having a pair of upstanding brackets 11 in which is journaled the main or driving shaft 12, driven from some suitable source of power, not shown, which may be applied to it at the pulley 13; such shaft is shown as carrying a pair of crank wrists 14 by which a cutter head 15 is controlled through the medium of links 16, the cutter head being guided in guideways between plates 17 and may have upstanding portions 18 for giving it a greater security and stability as it moves up and down in the guideway. The sheet of material to be cut will be fed over the feed plate 19, the front edge of which will be provided with a removable plate 20 constituting the lower knife of the shear. The upper knife, as will be seen from the plan view, has a sinuous or ogee formation. The knife may be made up in some convenient manner, as for instance, a number of knife blades 21, four being illustrated in the present instance for the purpose of convenience. Each of which knives is shown as having reverse curves, and as having edges 22, 23 which may be disposed at an angle from the horizontal, so that as the knife descends the lowermost portion, that portion which is in the general region designated by the reference character 24, will inaugurate the cutting and the relative position of the knives and the direction of the feed may be such that the cut will be completed before the joint or junction 25 between the knives reaches the lower knife. The stock 30 will be fed forward between the upper and a lower feed roll 31, 32 respectively, which rolls are journaled in the stanchions 33 of a slide 34 shiftable crosswise of the machine, that is, in a direction parallel to the general line of cutting of the knife. Such slide has articulated to it a lever 35 pivoted at 36 to one of the standards 11, and carrying a roll 37 running upon a cam face 38 carried by a gear wheel 39 which is in mesh with a gear wheel 40 upon the driving shaft; the gears in the present instance are at the ratio of one to two. The feed rolls carry intermeshing gear wheels 41 and 42 respectively, and one of the rolls, as for instance the upper roll carries a ratchet wheel 43, the pawl 44 for such ratchet wheel being carried by an arm 45 to which is pivoted a link 48 connected by a ball joint to a slide 47 adjustable endwise upon the crank 48 fast to the driving shaft.

By the mechanism above described at each descent of the cutter head 15 the pawl will be drawn freely down over the ratchet wheel, and upon each ascent of the knife the pawl will engage the ratchet wheel and feed the stock forward between the pair of oppositely rotated rolls the predetermined distance, which has been secured by the adjustment of the slide 47 on the crank. By reference to Fig. 5 it will be seen that the knives 21 will after cutting the edge of the stock leave the same with a sinuous edge, and by repeated cutting where the stock is fed forward and slightly sidewise between the respective cuttings the shavings will present an appearance wherein the central portion as 50, is wider than the ends, the ends narrowing down as at 51, and in the present instance being attenuated to points. Such diagram shows the manner in which the respective feeds and descents of the cutting knives have produced a series of shavings or fiber-stands. For the purpose of shifting the paper stock from side to side the shifting carriage 34 actuated from the cam 38 is provided, the feed rolls being given sufficient bite upon the paper stock to shift it toward one side and then the other either during the feed or immediately preceding or following the same as occasion may demand.

A form of material upon which this machine is peculiarly adapted to be employed is that which is made up from such wood fiber as is employed in making paper. This may be commingled with a certain amount of fibers which may be relatively fine, and in practice from one to two per cent. in weight of fine cotton fibers may be intimately intermingled with the wood fibers to both hold and bind them together in the sheet form which will be made in some suitable manner known to those skilled in that particular art. This binding will not only be useful to give stability to the sheet before it is treated upon one side as will presently be described; but will also give stability to the fibrous portion of the fiber-strand after the same has been severed. The sheet may be treated upon one side, as for instance by the application of some reinforcing material in the form of a layer spread or suitably applied to one side of said sheet of material, which after being sufficiently seasoned or dried as the case may be may then be fed to the machine and cut up. For certain uses it is desirable that the cut edges of fiber stock shall be clear and clean, that is that they shall not be encumbered with fuzz or lint or projecting uncut or torn fibers, which would have a tendency to clog up the surfaces and prevent the ready absorption of fluids by the absorptive mass which each shaving or fiber-strand represents. In certain forms of arrangement of knives the upper knife comes down over the lower knife and shears off the stock and the same will curl upon itself; and it is believed that in the present form of device the surface of the sheet which is uppermost will be curled upon the outside, so that the surface which is presented upon the outside of the fiber-strand may be controlled by properly placing the sheet in the device.

In Fig. 4 it will be seen that one of the knives 21 will be cutting by each of its edges 22 and 23 strips 220 and 230 which when completely severed will assume some such formation as that illustrated in Fig. 6.

Having described my invention I claim:

1. In mechanism for shearing sheet material, the combination with means for feeding the sheet by the resultant of a combined advancing and lateral movement, a pair of members having complemental sinuous shear edges, means for bringing these together at an incline one relative to the other, and adapted and timed for cutting the sheet on lines out of parallelism with the lines of the preceding cutting.

2. In a mechanism for the manufacture of curved, curled paper fiber-strands, the combination with complemental sinuous relatively inclined shears, of means for feeding sheet material thereto by the resultant of a forward and sidewise movement, and comprising feed rolls and means for rotating these, and means for axially shifting the rolls prior to each successive cut.

3. The combination with a bed having a sinuous shear edge, of a complemental sinuous knife, feed rolls for feeding sheet material over the bed and said shear edge, and means for axially shifting said rolls for bringing the cut edge of the material out of parallelism with said shear edge prior to each successive cut.

4. The combination with a bed having a sinuous shear edge, of a complemental sinuous knife, means for bringing these together at a relative incline, feed rolls for feeding sheet material over the bed and said shear edge, and means for axially shifting said rolls for bringing the cut edge of the material out of parallelism with said shear edge prior to each successive cut.

5. The combination with complemental sinuous shears, of means for feeding sheet material between the same and laterally to bring the sinuous cut line of the sheet into such relation to the sinuous cut line of the shears that the said cut line will at places coincide with the cutting line and at other places extend beyond the same.

6. The combination with a member having a sinuous shear edge, of means for feeding sheet material over the same and laterally to bring the sinuous cut line from one cutting into such relation to the said shear edge that the said line will at places coincide with said shear edge and at places extend beyond the same, and means coöperative with said shear edge for severing said material at the extending portions and advancing along the shear edge from end to end thereof.

7. In a machine for shearing fibrous sheet material, the combination of sheet feeding mechanism and sheet cutting mechanism, the latter comprising a pair of complemental sinuous cutting members, one having inclined cutting edges, means for shifting one of said cutting members toward and from the other, and means for shifting one of said mechanisms relatively to the other whereby the sheet will be cut alternately along lines out of parallelism.

8. In a machine for shearing fibrous sheet material, the combination of sheet feeding mechanism and sheet cutting mechanism, the latter comprising a pair of cutting members, one having a sinuous cutting edge and the other made up of a plurality of sinuously formed blades, means for shifting one of said cutting members toward and from the other, and means for shifting one of said mechanisms relatively to the other whereby the sheet will be cut alternately along lines out of parallelism.

9. In a machine for shearing fibrous sheet material, the combination of sheet feeding mechanism and sheet cutting mechanism, the latter comprising a pair of cutting members, one having a sinuous cutting edge and the other made up of a plurality of sinuously formed blades each having an inclined cutting edge, means for shifting one of said cutting members toward and from the other, and means for shifting one of said mechanisms relatively to the other whereby the sheet will be cut alternately along lines out of parallelism.

10. In a machine for shearing fibrous sheet material, the combination of sheet feeding mechanism and sheet cutting mechanism, the latter comprising a pair of cutting members, one having a sinuous cutting edge and the other made up of a plurality of sinuously formed blades each having a pair of inclined cutting edges, means for shifting one of said cutting members toward and from the other, and means for shifting one of said mechanisms relatively to the other whereby the sheet will be cut alternately along lines out of parallelism.

11. In a machine for cutting fibrous sheets, the combination of a pair of feeding rolls, a pair of complemental cutting members, a driving shaft connected with one of said cutting members for shifting it toward and from the other, means connected with said driving shaft for rotating said rolls, and means also connected with said driving shaft for shifting said rolls laterally and comprising a lever and a cam driven from said driving shaft for shifting said lever.

12. In a machine for cutting fibrous sheets, the combination of a pair of feeding rolls, a pair of complemental cutting members, one having a sinuous edge and the other made up of a plurality of sinuously formed cutting blades each having a pair of inclined cutting edges, a driving shaft connected with one of said cutting members for shifting it toward and from the other, means connected with said driving shaft for rotating said rolls, and means also connected with said driving shaft for shifting said rolls laterally and comprising a lever and a cam driven from said driving shaft for shifting said lever.

Signed at Washington, D. C., this 13th day of January, 1906.

WILLARD R. GREEN.

Witnesses:
A. M. PARKINS,
E. J. W. CLARKSON.